S. M. DEBAKEY.
AUTOMOBILE AUXILIARY TABLE.
APPLICATION FILED JAN. 9, 1920.
1,337,886. Patented Apr. 20, 1920.
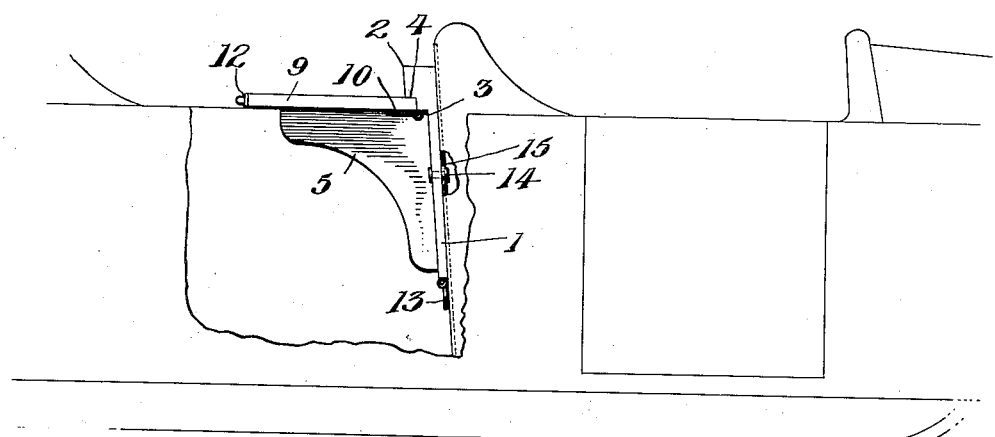
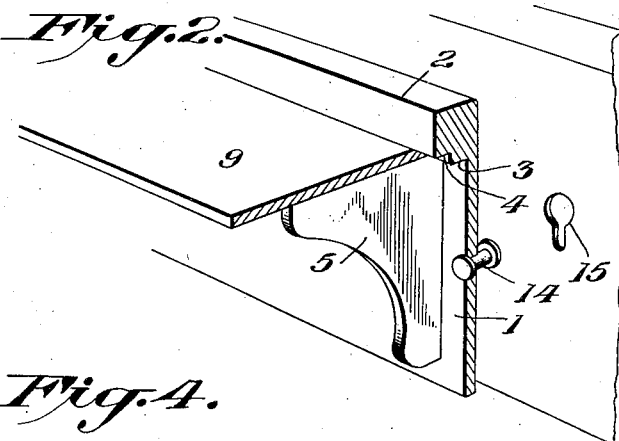
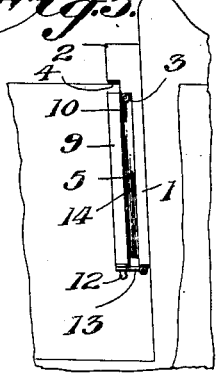
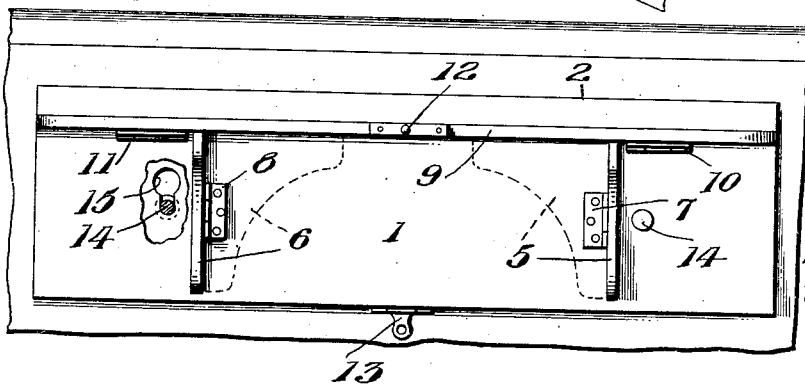
Inventor
S. M. Debakey,
by Wilkinson
& Giusta.
Attorneys.

UNITED STATES PATENT OFFICE.

SHIKER M. DEBAKEY, OF LAKE CHARLES, LOUISIANA.

AUTOMOBILE AUXILIARY TABLE.

1,337,886.     Specification of Letters Patent.     Patented Apr. 20, 1920.

Application filed January 9, 1920. Serial No. 350,358.

*To all whom it may concern:*

Be it known that I, SHIKER M. DEBAKEY, a citizen of the United States, residing at Lake Charles, in the parish of Calcasieu and State of Louisiana, have invented certain new and useful Improvements in Automobile Auxiliary Tables; and I do hereby declare the following to be a full, clear, and exact description of the invention, such as will enable others skilled in the art to which it appertains to make and use the same.

The present invention relates to improvements in automobile tables, and an object thereof is to provide a table that may be easily folded up into a compact condition so as not to interfere with the space in the vehicle, and capable of being quickly and easily set up when required.

Another object of the present invention is to provide a compact folding table with means whereby it may be applied to existing constructions of automobiles without alteration therein.

A further object of the invention is to provide an improved folding table which may be mounted in an automobile, and, when desired, removed therefrom and set up in a house or other location where it may be desired to use the same.

With these and further objects in view as will in part hereinafter become apparent and in part be stated, the invention comprises certain novel constructions, combinations and arrangements of parts as subsequently specified and claimed.

In the accompanying drawings,—

Figure 1 is a fragmentary, side elevational view of a vehicle, with parts broken away, and showing the improved table in the condition of use.

Fig. 2 is a fragmentary, perspective view showing the mode of attaching the table.

Fig. 3 is a view similar to Fig. 1, showing the table collapsed, and

Fig. 4 is a front elevational view of the improved table shown applied to an automobile in fragmentary section.

Referring more particularly to the drawings wherein only a single embodiment of the invention is illustrated, 1 designates a back or base-board which carries at its upper longitudinal edge a head 2 having an under surface that projects beyond the plane of the base-board 1, and which is formed in two steps 3 and 4. A pair of leaves 5 and 6 are hinged to the base-board 1, as by vertically-disposed hinges 7 and 8 respectively, which permit the leaves 5 and 6 to swing in horizontal planes, whereby they may be collapsed against the rear face of the base-board 1, or be swung out at right angles to said base-board, in which condition the upper edges of the leaves engage against the under side of the table top 9. The upper edges of the leaves 5 and 6 engage beneath the stepped surface 3, when the leaves are in the folded condition, and the inner portions of said upper edges engage beneath the stepped surface 3 even when the leaves are in the folded-out condition which makes for a stronger structure, throwing a portion of the strain on the head 2 and base-board 1.

The table top 9 is hinged, as by means of the hinges 10 and 11, to the head 2 and is adapted to swing in a vertical plane at substantially right angles to the direction of movement of the leaves 5 and 6. The table top 9 has its inner longitudinal edge engaging beneath the stepped surface 4 of the head 2 against which it is held by the leaves 5 and 6 when in the open condition shown in Figs. 1 and 2. This acts as a stop to prevent undue lifting of the table top 9, and contributes to the strength of the entire construction. When folded as shown in Fig. 3, the leaves 5 and 6 lie within the plane of the stepped surface 3, while the table top 9 lies within the plane of the second stepped surface 4, the head 2 protecting the various hinge joints from knocks and jars that might otherwise be received when the table is in the folded condition during transportation.

A stud 12 is preferably fixed on the outer edge of the table top 9 and a hinged clasp or keeper 13 may be secured to the lower edge of the base-board 1 in such a position as to engage the stud 12, as shown in Fig. 3, when the table top 9 is folded down against the collapsed leaves 5 and 6. This keeper insures the flat condition of the parts during transportation and when not in use.

Headed pins 14 are mounted in the base-board 1 and project forwardly therefrom so as to engage in key-hole slots 15, which are made in the object to which the collapsible table is to be applied. In the present drawings, these key-hole slots 15 are shown as made in the rear portion of the front seat of an automobile, but it will be obvious that such slots may be made in other objects, both on the vehicle and in houses or other locations where a table of this kind might be of service. The heads of the bolts 14 freely enter the enlarged upper portions of the key-hole slots 15, and the shanks of the bolts 14 pass down within the restricted portions of the slots 15 where the heads of the bolts are held from escape. By lifting the table and its parts, the bolts may be raised to a position which will allow of the heads being withdrawn through the slots 15. Of course, other modes of attachment may be resorted to.

With the table as shown in the accompanying drawings, the same, when folded out, is in position for use by occupants of the rear seat of the automobile, and when collapsed down to the condition shown in Fig. 3, the improved table takes up very little space and does not interfere with other apparatus in the car or the free movement of the occupants.

I have described preferred and satisfactory constructions, but it will be obvious that various changes and modifications may be resorted to without departing from the spirit of my invention.

What is claimed is:—

1. An improved table including a base board, a head on one longitudinal edge of the base board projecting at one side beyond the plane of the base board and having two stepped surfaces on the under side of the head beyond the base board, a pair of leaves hinged to swing in a horizontal plane and supported from said base board, said leaves having their upper edges adapted to engage beneath one of said stepped surfaces, and said leaves lying within the plane of said stepped surface when in the folded condition, a table top hinged for vertically swinging to said head and adapted when folded to lie parallel with the base board and in the plane with the second mentioned stepped surface whereby to confine the leaves between said base board and table top, the second mentioned stepped surface acting as a stop to engage the upper surface of the table top when swung out to position of use, and means whereby said base plate and the parts carried thereby may be secured to a support, substantially as described.

2. In combination with an automobile having front and rear seats, and the back of the front seat provided with keyhole slots therein, of a base plate adapted to be fitted against the back of said front seat, headed pins projecting forwardly from said base plate adapted to enter the enlarged portions of the keyhole slots in the back of the front seat, the shanks of the pins fitting snugly within the constricted portions of the keyhole slots when the pins are allowed to descend, a head formed in one piece with the upper longitudinal edge of the base board, a pair of leaves hinged to the base board and adapted to collapse beneath said head, and a top hinged to the head and adapted to collapse within the plane of the head and parallel to the collapsed leaves and base board, means arranged between the lower edge of said base board and the free edge of the table top for holding the latter in collapsed position and also for indirectly holding the leaves collapsed, substantially as described.

3. An improved table including a vertically-disposed base-board, a head on the upper longitudinal edge of the base-board projecting rearwardly beyond the plane of the base-board and having two stepped surfaces on the under side of the head beyond the base-board, a pair of leaves hinged to swing in a horizontal plane and supported from said base-board, said leaves having their upper edges adapted to engage beneath one of said stepped surfaces, and said leaves lying within the plane of said stepped surface when in the folded condition, a table top hinged for vertical swinging to said head and adapted when folded to lie parallel with the base-board and in the plane with the second-mentioned stepped surface, whereby to confine the leaves between said base-board and table top, the second-mentioned stepped surface acting as a stop to engage the upper surface of the table top when elevated, a keeper carried by the free edge of said table top and by the lower edge of the base-board for holding the table top in the collapsed condition, headed pins projecting from said base-board, and an object having key-hole slots adapted to be engaged by said headed pins, substantially as described.

SHIKER M. DEBAKEY.